US011240609B2

(12) United States Patent
Dehghani et al.

(10) Patent No.: US 11,240,609 B2
(45) Date of Patent: Feb. 1, 2022

(54) MUSIC CLASSIFIER AND RELATED METHODS

(71) Applicant: SEMICONDUCTOR COMPONENTS INDUSTRIES, LLC, Phoenix, AZ (US)

(72) Inventors: Pejman Dehghani, Kingston (CA); Robert L. Brennan, Kitchener (CA)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/429,268

(22) Filed: Jun. 3, 2019

(65) Prior Publication Data

US 2019/0394578 A1 Dec. 26, 2019

Related U.S. Application Data

(60) Provisional application No. 62/688,726, filed on Jun. 22, 2018.

(51) Int. Cl.

| | |
|---|---|
| ***G06F 17/00*** | (2019.01) |
| ***H04R 25/00*** | (2006.01) |
| ***G10L 25/30*** | (2013.01) |
| ***G10L 25/18*** | (2013.01) |
| ***G10L 25/51*** | (2013.01) |

(52) U.S. Cl.

CPC ............ *H04R 25/505* (2013.01); *G10L 25/18* (2013.01); *G10L 25/30* (2013.01); *G10L 25/51* (2013.01); *G10H 2210/076* (2013.01); *H04R 2225/41* (2013.01)

(58) Field of Classification Search

CPC .... H04R 25/505; H04R 3/00; H04R 2225/41; H04R 2460/03; G10L 25/18; G10L 25/30; G10L 25/51; G10L 25/81; G10H 1/125; G10H 2210/046; G10H 2210/076

USPC ............................................................ 700/94

See application file for complete search history.

(56) References Cited

U.S. PATENT DOCUMENTS

| | | | | |
|---|---|---|---|---|
| 6,236,731 | B1 | 5/2001 | Brennan et al. | |
| 6,240,192 | B1 | 5/2001 | Brennan et al. | |
| 2005/0038651 | A1 * | 2/2005 | Zhang | G10L 25/78 704/233 |
| 2005/0096898 | A1 | 5/2005 | Singhal | |

(Continued)

OTHER PUBLICATIONS

MFCC components (Year: 2017).*

*Primary Examiner* — Paul C Mccord

(74) *Attorney, Agent, or Firm* — Brake Hughes Bellerman LLP

(57) ABSTRACT

An audio device that includes a music classifier that determines when music is present in an audio signal is disclosed. The audio device is configured to receive audio, process the received audio, and to output the processed audio to a user. The processing may be adjusted based on the output of the music classifier. The music classifier utilizes a plurality of decision making units, each operating on the received audio independently. The decision making units are simplified to reduce the processing, and therefore the power, necessary for operation. Accordingly each decision making unit may be insufficient to determine music alone but in combination may accurately detect music while consuming power at a rate that is suitable for a mobile device, such as a hearing aid.

19 Claims, 11 Drawing Sheets

(56) References Cited

U.S. PATENT DOCUMENTS

| | | | | |
|---|---|---|---|---|
| 2009/0019025 | A1* | 1/2009 | Chen | G06F 16/634 |
| 2011/0058698 | A1* | 3/2011 | Buhmann | H04R 25/43<br>381/314 |
| 2011/0075851 | A1* | 3/2011 | LeBoeuf | H04R 29/00<br>381/56 |
| 2011/0264447 | A1 | 10/2011 | Visser et al. | |
| 2013/0066629 | A1 | 3/2013 | Konchitsky | |
| 2014/0180673 | A1* | 6/2014 | Neuhauser | G10L 19/018<br>704/9 |
| 2014/0379352 | A1* | 12/2014 | Gondi | G10L 25/63<br>704/271 |
| 2015/0094835 | A1* | 4/2015 | Eronen | G06F 3/165<br>700/94 |
| 2016/0019909 | A1* | 1/2016 | Shi | G10L 25/21<br>704/226 |
| 2016/0099007 | A1* | 4/2016 | Alvarez | G10L 21/034<br>704/225 |
| 2016/0155456 | A1* | 6/2016 | Wang | G10L 19/12<br>704/208 |
| 2017/0061969 | A1* | 3/2017 | Thornburg | G10L 25/51 |
| 2017/0133041 | A1* | 5/2017 | Mortensen | G10L 25/78 |
| 2017/0180875 | A1* | 6/2017 | Theill | H04R 25/505 |
| 2017/0330540 | A1* | 11/2017 | Quattro | G10H 1/0008 |
| 2020/0074982 | A1* | 3/2020 | McCallum | G10L 15/16 |
| 2021/0201889 | A1* | 7/2021 | Feng | G10L 15/02 |

* cited by examiner

MUSIC CLASSIFIER AND RELATED METHODS

CROSS-REFERENCE To RELATED APPLICATION

This application claims benefit of U.S. Provisional Application No. 62/688,726, filed Jun. 22, 2018, and entitled, "A COMPUTATIONALLY EFFICIENT SUB-BAND MUSIC CLASSIFIER," which is hereby incorporated by reference in its entirety.

This application is related to U.S. Non-provisional application Ser. No. 16/375,039 filed on Apr. 4, 2019 and entitled, "COMPUTATIONALLY EFFICIENT SPEECH CLASSIFIER AND RELATED METHODS," which claims priority to U.S. Provisional Application No. 62/659,937, filed Apr. 19, 2018, both of which are incorporated herein by reference in their entireties.

FIELD OF THE DISCLOSURE

The present disclosure relates to an apparatus for music detection and related methods for music detection. More specifically, the present disclosure relates to detecting the presence or absence of music in applications having limited processing power, such as for example, hearing aids.

BACKGROUND

Hearing aids may be adjusted process audio differently based on an environment type and/or based on an audio type a user wishes to experience. It may be desirable to automate this adjustment to provide a more natural experience to a user. The automation may include the detection (i.e., classification) of the environment type and/or the audio type. This detection, however, may be computationally complex, implying that a hearing aid with automated adjustment consumes more power than a manual (or no) adjustment hearing aid. The power consumption may increase further as the number of detectable environment types and/or audio types is increased to improve the natural experience for the user. Because, in addition to providing a natural experience, it is highly desirable for a hearing aid to be small and to operate for long durations on a single charge, a need exists for a detector of environment type and/or audio type to operate accurately and efficiently without significantly increasing the power consumption and/or size of the hearing aid.

SUMMARY

In at least one aspect, the present disclosure generally describes a music classifier for an audio device. The music classifier includes a signal conditioning unit that is configured to transform a digitized, time-domain audio signal into a corresponding frequency domain signal including a plurality of frequency bands. The music classifier also includes a plurality of decision making units that operate in parallel and that are each configured to evaluate one or more of the plurality of frequency bands to determine a plurality of feature scores, where each feature score corresponds to a characteristic (i.e., feature) associated with music. The music classifier also includes a combination and music detection unit that is configured to combine feature scores over a period of time to determine if the audio signal includes music.

In possible implementations, the decision making units of the music classifier may include one or more of a beat detection unit, a tone detection unit, and a modulation activity tracking unit.

In a possible implementation, the beat detection unit may detect, based on a correlation, a repeating beat pattern in a first (e.g., lowest) frequency band of the plurality of frequency bands, while in another possible implementation, the beat detection unit may detect the repeating pattern, based on an output of a neural network that receives as its input the plurality of frequency bands.

In a possible implementation, the combination and music detection unit is configured to apply a weight to each feature score to obtain weighted feature scores and to sum the weighted feature scores to obtain a music score. The possible implementation may be further characterized by the accumulation of music scores for a plurality of frames and by computing an average of the music scores for the plurality of frames. This average of the music scores for the plurality of frames may be compared to a threshold to determine music or no-music in the audio signal. In a possible implementation a hysteresis control may be applied to the output of the threshold comparison so that the music or no-music decision is less prone to spurious changes (e.g., due to noise). In other words, the final determination of a current state of the audio signal (i.e., music/no-music) may be based on a previous state (i.e., music/no-music) of the audio signal. In another possible implementation, the combination and music detection approach described above is replaced by a neural network that receives the feature scores as inputs and delivers an output signal having a state of music or a state of no-music.

In another aspect, the present disclosure generally describes a method for music detection. In the method, an audio signal is received and digitized to obtain a digitized audio signal. The digitized audio signal is transformed into a plurality of frequency bands. The plurality of frequency bands are then applied to a plurality of decision making units that operate in parallel, to generate respective feature scores. Each feature score corresponds to a probability that a particular music characteristic (e.g., a beat, a tone, a high modulation activity, etc.) is included in the audio signal (i.e., based on data from the one or more frequency bands). Finally, the method includes combining the feature scores to detect music in the audio signal.

In a possible implementation, an audio device (e.g., a hearing aid) performs the method described above. For example, a non-transitory computer readable medium containing computer readable instructions may be executed by a processor of the audio device to cause the audio device to perform the method described above.

In another aspect, the present disclosure generally describes a hearing aid. The hearing aid includes a signal conditioning stage that is configured to convert a digitized audio signal to a plurality of frequency bands. The hearing aid further includes a music classifier that is coupled to the signal conditioning stage. The music classifier includes a feature detection and tracking unit that includes a plurality of decision making units operating in parallel. Each decision making unit is configured to generate a feature score corresponding to a probability that a particular music characteristic is included in the audio signal. The music classifier also includes a combination and music detection unit that, based on the feature score from each decision making unit, is configured to detect music in the audio signal. The combination and music detection unit is further configured to produce a first signal indicating music while music is detected in the audio signal and is configured to produce a second signal indicating no-music signal otherwise.

In a possible implementation, the hearing aid includes an audio signal modifying stage that is coupled to the signal conditioning stage and to the music classifier. The audio signal modifying stage is configured to process the plurality of frequency bands differently when a music signal is received than when a no-music signal is received.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

The present disclosure is directed to an audio device (i.e., apparatus) and related method for music classification (e.g., music detection). As discussed herein, music classification (music detection) refers to identifying music content in an audio signal that may include other audio content, such as speech and noise (e.g., background noise). Music classification can include identifying music in an audio signal so that the audio can be modified appropriately. For example, the audio device may be a hearing aid that can include algorithms for reducing noise, cancelling feedback, and/or controlling audio bandwidth. These algorithms may be enabled, disabled, and/or modified based on the detection of music. For example, a noise reduction algorithm may reduce signal attenuation levels while music is detected to preserve a quality of the music. In another example, a feedback cancellation algorithm may be prevented (e.g., substantially prevented) from cancelling tones from music as it would otherwise cancel a tone from feedback. In another example, the bandwidth of audio presented by the audio device to a user, which is normally low to preserve power, may be increased when music is present to improve a music listening experience.

The implementations described herein can be used to implement a computationally efficient and/or power efficient music classifier (and associated methods). This can be accomplished through the use of decision making units that can each detect a characteristic (i.e., features) corresponding to music. Alone, each decision making unit may not classify music with a high accuracy. The outputs of all the decision making units, however, may be combined to form an accurate and robust music classifier. An advantage of this approach is that the complexity of each decision making unit can be limited to conserve power without negatively affecting the overall performance of the music classifier.

In the example implementations described herein, various operating parameters and techniques, such as thresholds, weights (coefficients), calculations, rates, frequency ranges, frequency bandwidths, etc. are described. These example operating parameters and techniques are given by way of example, and the specific operating parameters, values, and techniques (e.g., computation approaches) used will depending on the particular implementation. Further, various approaches for determining the specific operating parameters and techniques for a given implementation can be determined in a number of ways, such as using empirical measurements and data, using training data, and so forth.

Figure 1:
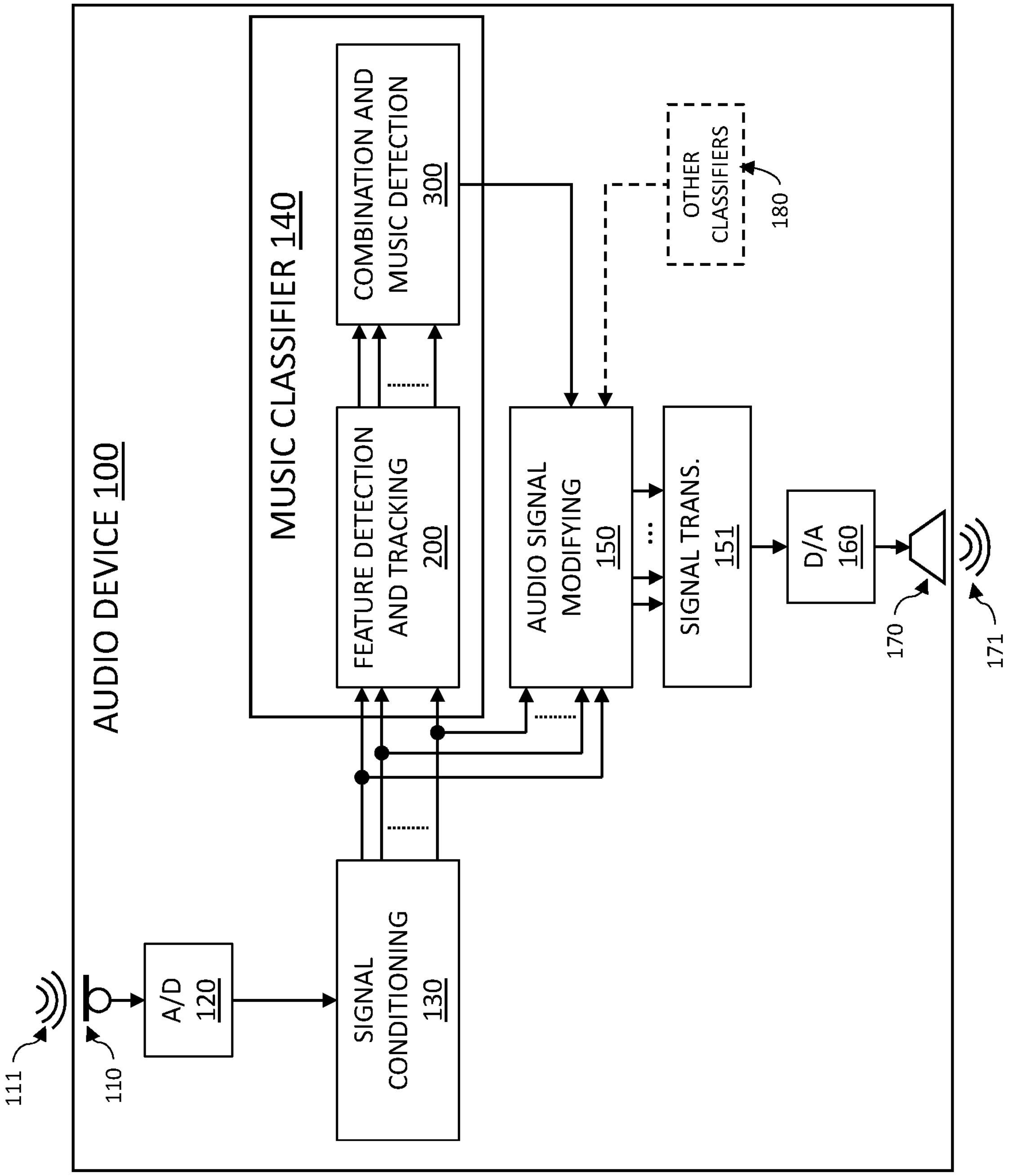
FIG. 1 is a functional block diagram that generally depicts an audio device including a music classifier according to a possible implementation of the present disclosure.

FIG. 1 is a functional block diagram that generally depicts an audio device implementing a music classifier. As shown in FIG. 1, the audio device 100 includes an audio transducer (e.g., a microphone 110). The analog output of the microphone 110 is digitized by an analog-to-digital (A/D) converter 120. The digitized audio is modified for processing by a signal conditioning stage 130. For example, the time domain audio signal represented by the digitized output of the A/D converter 120 may transformed by the signal conditioning stage 130 into a frequency domain representation, which can be modified by an audio signal modifying stage 150.

The audio signal modifying stage 150 may be configured to improve a quality of the digital audio signal by cancelling noise, filtering, amplifying, and so forth. The processed (e.g., improved quality) audio signal can then be transformed 151 to a time-domain digital signal and converted into an analog signal by a digital-to-analog (D/A) converter 160 for playback on an audio output device (e.g., speaker 170) to produce output audio 171 for a user.

In some possible implementations, the audio device 100 is a hearing aid. The hearing aid receives audio (i.e., sound pressure waves) from an environment 111, process the audio as described above, and presents (e.g., using a receiver of a hearing aid170) the processed version of the audio as output audio 171 (i.e., sound pressure waves) to a user wearing the hearing aid. Algorithms implemented audio signal modifying stage can help a user understand speech and/or other sounds in the user's environment. Further, it may be convenient if the choice and/or adjustment of these algorithms proceed automatically based on various environments and/ or sounds. Accordingly, the hearing aid may implement one or more classifiers to detect various environments and/or sounds. The output of the one or more classifiers can be used adjust one or more functions of the audio signal modifying stage 150 automatically.

One aspect of desirable operation may be characterized by the one or more classifiers providing highly accurate results in real-time (as perceived by a user). Another aspect of desirable operation may be characterized by low power consumption. For example, a hearing aid and its normal operation may define a size and/or a time between charging of a power storage unit (e.g., battery). Accordingly, it is desirable that an automatic modification of the audio signal based on real-time operation of one or more classifiers does not significantly affect the size and/or the time between changing of the battery for the hearing aid.

The audio device 100 shown in FIG. 1 includes a music classifier 140 that is configured to receive signals from the signal conditioning stage 130 and to produce an output that corresponds to the presence and/or absence of music. For example, while music is detected in audio received by the audio device 100, the music classifier 140 may output a first signal (e.g., a logical high). While no music is detected in audio received by the audio device, the music classifier may output a second signal (e.g., a logical low). The audio device may further include one or more other classifiers 180 that output signals based on other conditions. For example, the classifier described U.S. patent application Ser. No. 16/375,039 may be included in the one or more other classifiers 180 in a possible implementation.

The music classifier 140 disclosed herein receives as its input, the output of a signal conditioning stage 130. The signal conditioning stage can also be used as part of the routine audio processing for the hearing aid. Accordingly, an advantage of the disclosed music classifier 140 is that it can use the same processing as other stages, thereby saving complexity and power requirements. Another advance of eh disclosed music classifier is its modularity. The audio device may deactivate the music classifier without affecting its normal operation. In a possible implementation, for example, the audio device could deactivate the music classifier 140 upon detecting a low power condition (i.e., low battery).

The audio device 100 includes stages (e.g., signal conditioning 130, music classifier 140, audio signal modifying 150, signal transformation 151, other classifiers 180) that can be embodied as hardware or as software. For example, the stages may be implemented as software running on a general purpose processor (e.g., CPU, microprocessor, multi-core processor, etc.) or special purpose processor (e.g., ASIC, DSP, FPGA, etc.).

Figure 2:
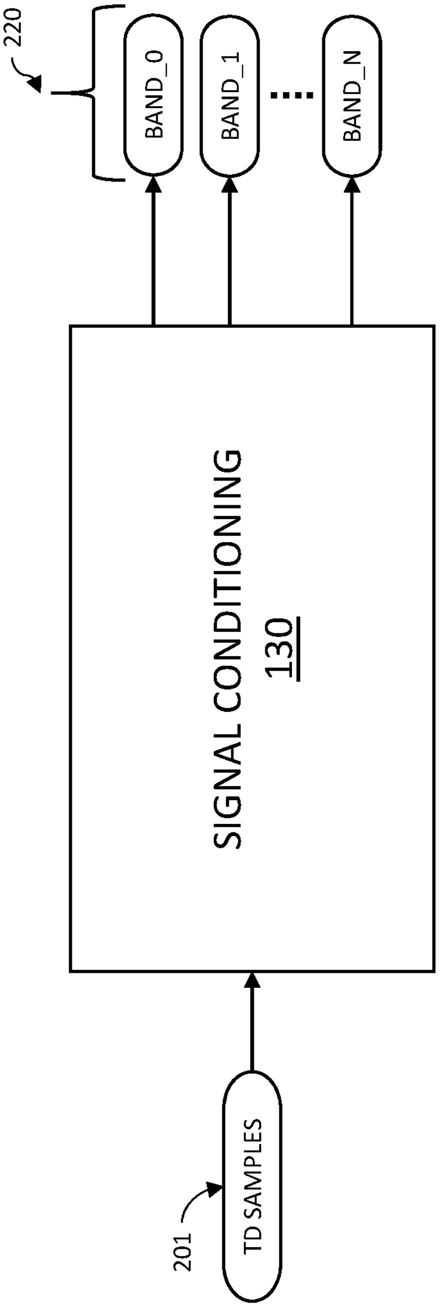
FIG. 2 is a block diagram that generally depicts a signal conditioning stage of the audio device of FIG. 1.

FIG. 2 is a block diagram that generally depicts a signal conditioning stage of the audio device of FIG. 1. The inputs to the signal conditioning stage 130 are time-domain audio samples 201 (TD SAMPLES). The time-domain samples 201 can be obtained through transformation of the physical sound wave pressure to an equivalent analog signal representation (voltage or current) by a transducer (microphone) followed by an A/D converter converting the analog signal to digital audio samples. This digitized time-domain signal is converted by the signal conditioning stage to frequency domain signal. The frequency domain signal may be characterized by a plurality of frequency bands 220 (i.e., frequency sub-bands, sub-bands, bands, etc.). In one implementation, the signal conditioning stage uses a Weighted Overlap-Add (WOLA) filter-bank, such as disclosed, for example, in U.S. Pat. No. 6,236,731, entitled "Filterbank Structure and Method for Filtering and Separating an Information Signal into Different Bands, Particularly for Audio Signal in Hearing Aids". The WOLA filter-band used can include a short-time window (frame) length of R samples and N sub-frequency bands 220 to transform the time-domain samples to their equivalent sub-band-frequency domain complex data representation.

As shown in FIG. 2, the signal conditioning stage 130 outputs a plurality of frequency sub-bands. Each non-overlapping sub-band represent frequency components of the audio signal in a range (e.g., +/−125 Hz) of frequencies around a center frequency. For example, a first frequency band (i.e., BAND_0) may be centered at zero (DC) frequency and include frequencies in the range from about 0 to about 125 Hz, a second frequency band (i.e., BAND_1) may be centered at 250 Hz and include frequencies in the range of about 125 Hz to about 250 Hz, and so on for a number (N) of frequency bands.

The frequency bands 220 (i.e., BAND_0, BAND_1, etc.) may be processed to modify the audio signal 111 received at the audio device 100. For example, the audio signal modifying stage 150 (see FIG. 1) may apply processing algorithms to the frequency bands to enhance the audio. Accordingly, the audio signal modifying stage 150 may be configured for noise removal and/or speech/sound enhancement. The audio signal modifying stage 150 may also receive signals from one or more classifiers that indicate the presence (or absence) of a particular audio signal (e.g., a tone), a particular audio type (e.g., speech, music), and/or a particular audio condition (e.g., background type). These received signals may change how the audio signal modifying stage 150 is configured for noise removal and/or speech/sound enhancement.

As shown in FIG. 1, a signal indicating the presence (or absence) of music, can be received at the audio signal modifying stage 150 from a music classifier 140. The signal may cause the audio signal modifying stage 150 to apply one or more additional algorithms, eliminate one or more algorithms, and/or change one or more algorithms it uses to process the received audio. For example, while music is detected, a noise reduction level (i.e., attenuation level) may be reduced so that the music (e.g., a music signal) is not degraded by attenuation. In another example, an entrainment (e.g., false feedback detection), adaptation, and gain of a feedback canceller may be controlled while music is detected so that tones in the music are not cancelled. In still another example, a bandwidth of the audio signal modifying stage 150 may be increased while music is detected to enhance the quality of the music and then reduced while music is not detected to save power.

The music classifier is configured to receive the frequency bands 220 from the signal conditioning stage 130 and to output a signal that indicates the presence or absences of music. For example, the signal may include a first level (e.g., a logical high voltage) indicating the presence of music and a second level (e.g., a logical low voltage) indicating the absence of music. The music classifier 140 can be configured to receive the bands continuously and to output the signal continuously so that a change in the level of the signal correlates in time to the moment that music begins or ends. As shown in FIG. 1, the music classifier 140 can include a feature detection and tracking unit 200 and a combination and music detection unit 300.

Figure 3:
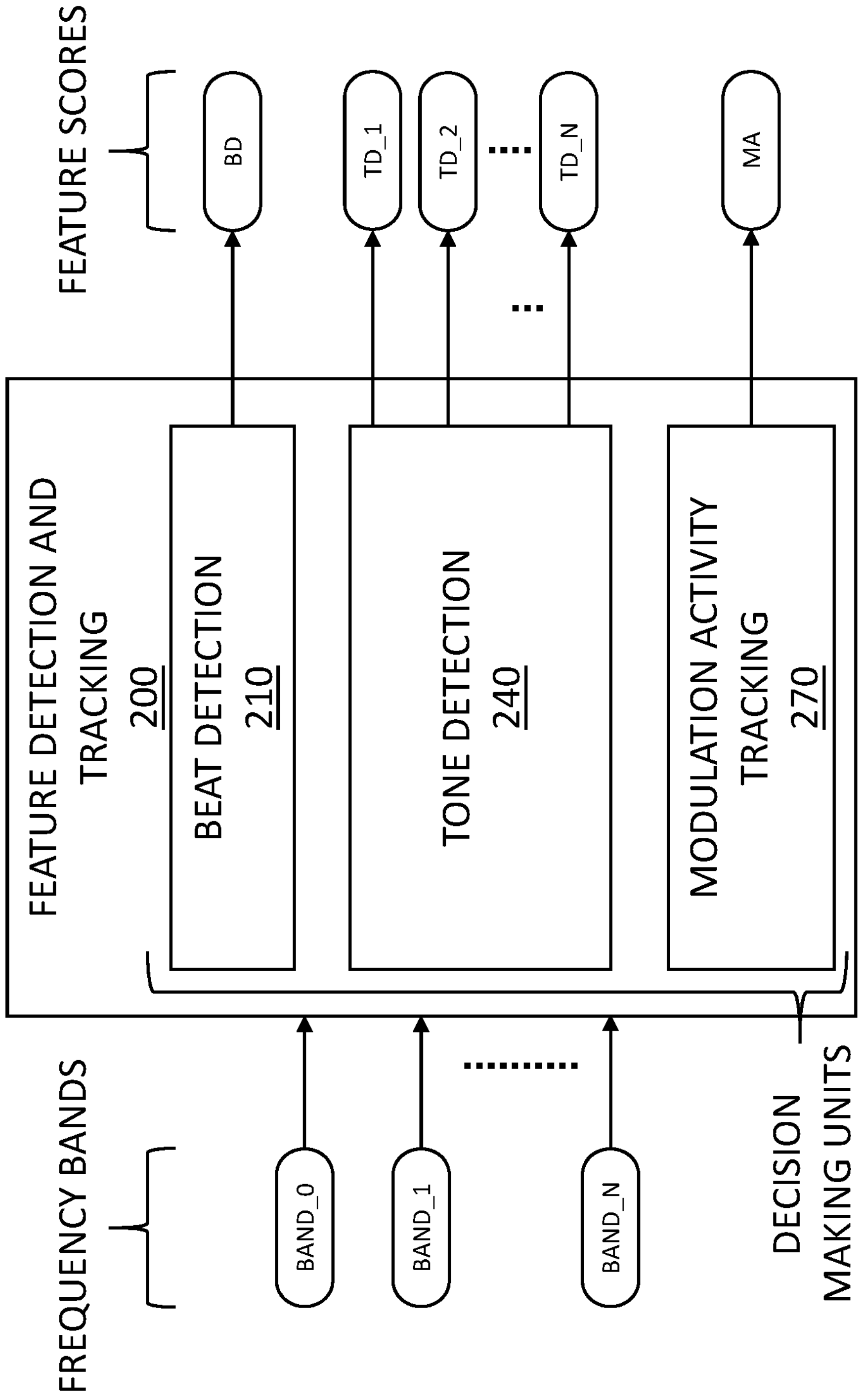
FIG. 3 is a block diagram that generally depicts a feature detection and detection and tracking unit of the music classifier of FIG. 1.

FIG. 3 is a block diagram that generally depicts a feature detection and tracking unit of the music classifier of FIG. 1. The feature detection and tracking unit includes a plurality of decision-making units (i.e., modules, units, etc.). Each decision making unit of the plurality is configured to detect and/or track a characteristic (i.e., feature) associated with music. Because each unit is directed to a single characteristic, the algorithmic complexity required for each unit to produce an output (or outputs) is limited. Accordingly, each unit may require fewer clock cycles to determine an output than would be required to determine all of the music characteristics using a single classifier. Additionally, the decision making units may operate in parallel and can provide their results together (e.g., simultaneously). Thus, the modular approach may consume less power to operate in (user-perceived) real-time than other approaches and is therefore well suited for hearing aids.

Each decision making unit of the feature detection and tracking unit of the music classifier may receive one or more (e.g., all) of the bands from the signal conditioning. Each decision making unit is configured to generate at least one output that corresponds to a determination about a particular music characteristic. The output of a particular unit may correspond to a two-level (e.g., binary) value (i.e., feature score) that indicates a yes or a no (i.e., a true or a false) answer to the question, "is the feature detected at this time." When a music characteristic has a plurality of components (e.g., tones), a particular unit may produce a plurality of outputs. In this case, each of the plurality of outputs may each correspond to a to a detection decision (e.g., a feature score that equals a logical 1 or a logical 0) regarding one of the plurality of components. When a particular music characteristic has a temporal (i.e., time-varying) aspect, the output of a particular unit may correspond to the presences or absence of the music characteristic in a particular time window. In other words, the output of the particular unit tracks the music characteristics having the temporal aspect.

Some possible music characteristics that may be detected and/or tracked are a beat, a tone (or tones), and a modulation activity. While alone each of these characteristics may be insufficient to accurately determine whether an audio signal contains music, when combined they the accuracy of the determination can be increased. For example, determining that an audio signal has one or more tones (i.e., tonality) may be insufficient to determine music because a pure (i.e. temporally constant) tone can be included in (e.g., exist in) an audio signal without being music. Determining that the audio signal also has a high modulation activity can help determine that the determined tones are likely music (and not a pure tone from another source). A further determination that the audio signal has a beat would strongly indicate the audio contains music. Accordingly, the feature detection and tracking unit 200 of the music classifier 140 can include a beat detection unit 210, a tone detection unit 240, and a modulation activity tracking unit 270.

Figure 4A:
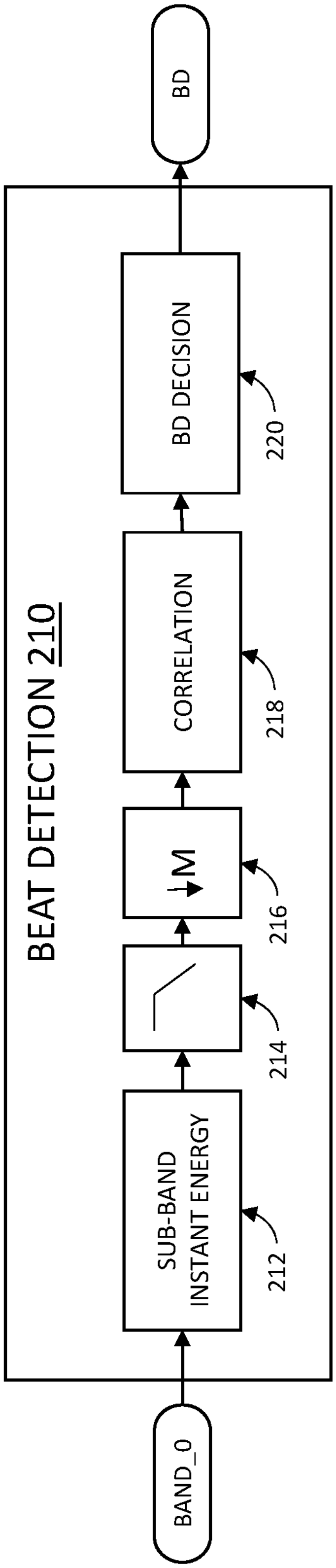
FIG. 4A is a block diagram that generally depicts a beat detection unit of the feature detection and tracking unit of the music classifier according to a first possible implementation.

FIG. 4A is a block diagram that generally depicts a beat detection unit of the feature detection and tracking unit of the music classifier according to a first possible implementation. The first possible implementation of the beat detection unit receives only the first sub-band (i.e., frequency band) (BAND_0) from the signal conditioning 130 because a beat frequency is most likely found within the range of frequencies (e.g., 0-125 Hz) of this band. First, an instantaneous sub-band (BAND_0) energy calculation 212 is performed as:

$$E_0[n]=X^2[n,\ 0]$$

where n is the current frame number, X [n, 0] is the real BAND_0 data and $E_0$[n] is the instantaneous BAND_0 energy for the current frame. If a WOLA filter-bank of the signal conditioning stage 130 is configured to be in an even stacking mode, the imaginary part of the BAND_0 (which would otherwise be 0 with any real input) is filled with a (real) Nyquist band value. Thus, in the Even Stacking mode $E_0$[n] is rather calculated as:

$$E_0[n]=\text{real}\{X[n,\ 0]\}^2$$

$E_0$[n] is then low-passed filtered 214 prior to a decimation 216 to reduce aliasing. One of the simplest and most power efficient low-pass filters 214 that can be used is the first order exponential smoothing filter:

$$E_{OLFP}[n]=\alpha_{bd}\times E_{OLPF}[n-1]+(1-\alpha_{bd})\times E_0[n]$$

where $\alpha_{bd}$ is the smoothing coefficient and $E_{OLFP}$[n] is the low-passed BAND_0 energy. Next, $E_{OLFP}$[n] is decimated 216 by a factor of M producing $E_b$[m] where m is the frame number at the decimated rate:

$$\frac{F_s}{R\times M},$$

where R is the number of samples in each frame, n.

At this decimated rate, screening for a potential beat is carried out at every m=$N_b$ where $N_b$ is the beat detection observation period length. The screening at the reduced (i.e., decimated) rate can save power consumption by reducing the number of samples to be processed within a given period. The screening can be done in several ways. One effective and computationally efficient method is using normalized autocorrelation 218. The autocorrelation coefficients can be determined as:

$$a_b[m,\tau]=\frac{\sum_{i=0}^{N_b}E_b[m-i]E_b[m-i+\tau]}{\sum_{i=0}^{N_b}E_b[m-i]^2}$$

where τ is the delay amount at the decimated frame rate and $\alpha_b$[m, τ] is the normalized autocorrelation coefficients at decimated frame number m and delay value τ.

A beat detection (BD) decision 220 is then made. To decide that a beat is present, $\alpha_b$[m, τ] is evaluated over a range of τ delays and a search is then done for the first sufficiently high local $\alpha_b$[m, τ] maximum according to an assigned threshold. The sufficiently high criterion can provide a strong enough correlation for the finding to be considered as a beat in which case, the associated delay value, τ, determines the beat period. If a local maximum is not found or if no local maximum is found to be sufficiently strong, the likelihood of a beat being present is considered low. While finding one instance that meets the criteria might be sufficient for beat detection, multiple findings with same delay value over several $N_b$ intervals greatly enhance the likelihood. Once a beat is detected, the detection status flag BD [$m_{bd}$] is set to 1 where $m_{bd}$ is the beat detection frame number at the $$\frac{F_s}{R\times M\times N_b}$$

rate. If a beat is not detected, the detection status flag BD[$m_{bd}$] is set to 0. Determining the actual tempo value is not explicitly required for beat detection. However, if the tempo is required, the beat detection unit may include a tempo determination that uses a relationship between r and the tempo in beats per minute as:

$$BPM = \frac{F_s \times 60}{R \times M \times \tau}$$

Since typical musical beats are between 40 and 200 bpm, $a_b[m, \tau]$ needs to be evaluated over only the r values that correspond to this range and thus, unnecessary calculations can be avoided to minimize the computations. Consequently, $a_b[\tau]$ is evaluated only at integer intervals between:

$$\tau = \frac{0.3 \times F_s}{R \times M} \text{ and } \tau = \frac{1.5 \times F_s}{R \times M}$$

The parameters R, $\alpha_{bd}$, $N_b$, M, the filter-bank's bandwidth, and the filter-bank's sub-band filters' sharpness are all interrelated and independent values cannot be suggested. Nevertheless, the parameter value selection has a direct impact on the number of computations and the effectiveness of the algorithm. For example, higher $N_b$ values produce more accurate results. Low M values may not be sufficient to extract the beat signature and high M values may lead to measurement aliasing jeopardizing the beat detection. The choice of $\alpha_{bd}$ is also linked to R, $F_S$ and the filter-bank characteristics and a misadjusted value may produce the same outcome as a misadjusted M.

Figure 4B:
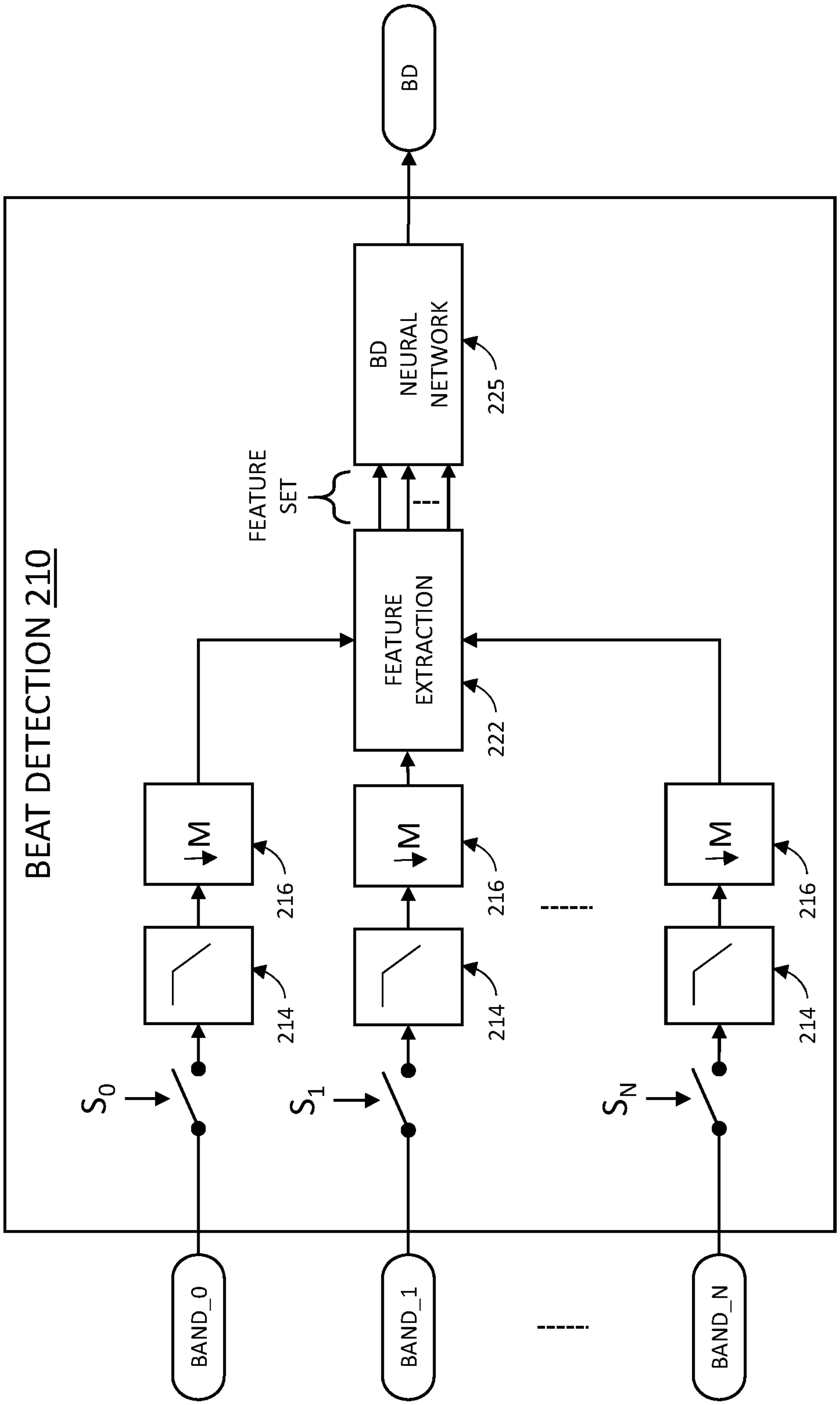
FIG. 4B is a block diagram that generally depicts a beat detection unit of the feature detection and tracking unit of the music classifier according to a second possible implementation.

FIG. 4B is a block diagram that generally depicts a beat detection unit of the feature detection and tracking unit of the music classifier according to a second possible implementation. The second possible implementation of the beat detection unit receives all sub-bands (BAND_0, BAND_1, . . . , BAND_N) from the signal conditioning 130. Each frequency band is low-pass filtered 214 and decimated 216 as in the previous implementation. Additionally, for each band a plurality of features (e.g., values for energy mean, energy standard deviation, energy maximum, energy kurtosis, energy skewness, and/or energy cross-correlation) are extracted 222 (i.e., determined, calculated, computed, etc.) over the observation periods $N_b$ and fed as a feature set to a neural network 225 for beat detection. The neural network 225 can be a deep (i.e. multilayer) neural network with a single neural output corresponding to the beat detection (BD) decision. Switches ($S_0$, $S_1$, . . . , $S_N$) may be used to control which bands are used in the beat detection analysis. For example, some switches may be opened to remove one or more bands that are considered to have limited useful information. For example, BAND_0 is assumed to contain useful information concerning a beat and therefore may be included (e.g., always included) in the beat detection (i.e., by closing $S_0$ switch). Conversely, one or more higher bands may be excluded from the subsequent calculations (i.e., by opening their respective switch) because they may contain different information regarding a beat. In other words, while BAND_0 may be used to detect a beat, one or more of the other bands (e.g., BAND_1 . . . BAND_N) may be used to further distinguish the detected beat between a musical beat and other beat-like sounds (i.e., tapping, rattling, etc.). The additional processing (i.e., power consumption) associated with each additional band can be balanced with the need for further beat detection discrimination based on the particular application. An advantage of the beat detection implementation shown in FIG. 4B is that it is adaptable to extract features from different bands as needed.

In a possible implementation, the plurality of features extracted 222 (e.g., for the selected bands) may include an energy mean for the band. For example, a BAND_0 energy mean ($E_{b,\mu}$) may be computed as:

$$E_{b\_\mu}[m] = \frac{1}{N_b} \sum_{i=0}^{N_b-1} E_b[m-i],$$

where $N_b$ is the observation period (e.g. number of previous frames) and m is the current frame number.

In a possible implementation, the plurality of features extracted 222 (e.g., for the selected bands) may include an energy standard deviation for the band. For example, a BAND_0 energy standard deviation ($E_{b,\sigma}$) may be computed as:

$$E_{b\_\sigma}[m] = \sqrt{\sum_{i=0}^{N_b-1} \frac{(E_b[m-i] - E_{b\_\mu}[m])^2}{N_b}}$$

In a possible implementation, the plurality of features extracted 222 (e.g., for the selected bands) may include an energy maximum for the band. For example, a BAND_0 energy maximum ($E_{b\_max}$) may be computed as:

$$E_{b\_max}[m] = \max(E_b[m-i]|_{i=0}^{i=N_b-1})$$

In a possible implementation, the plurality of features extracted 222 (e.g., for the selected bands) may include an energy kurtosis for the band. For example, a BAND_0 energy kurtosis ($E_{b\_k}$) may be computed as:

$$E_{b\_k}[m] = \frac{1}{N_b} \sum_{i=0}^{N_b-1} \left( \frac{E_b[m-i] - E_{b\_\mu}[m]}{E_{b\_\sigma}} \right)^4$$

In a possible implementation, the plurality of features extracted 222 (e.g., for the selected bands) may include an energy skewness for the band. For example, a BAND_0 energy skewness ($E_{b\_s}$) may be computed as:

$$E_{b\_s}[m] = \frac{1}{N_b} \sum_{i=0}^{N_b-1} \left( \frac{E_b[m-i] - E_{b\_\mu}[m]}{E_{b\_\sigma}[m]} \right)^3$$

In a possible implementation, the plurality of features extracted 222 (e.g., for the selected bands) may include an energy cross-correlation vector for the band. For example, a BAND_0 energy cross-correlation vector ($E_{b\_xcor}$) may be computed as:

$$\overline{E}_{b\_xcor}[m] = [\alpha_b[m, \tau_{40}], \alpha_b[m, \tau_{40}-1], \ldots, \alpha_b[m, \tau_{200}+1], \alpha_b[m, \tau_{200}]]$$

where τ is the correlation lag (i.e., delay). The delays in the cross-correlation vector may be computed as:

$$\tau_{200} = \text{round}\left(\frac{0.3 \times F_s}{R \times M}\right) \text{ and } \tau_{40} = \text{round}\left(\frac{1.5 \times F_s}{R \times M}\right)$$

While the present disclosure is not limited to the set of extracted features described above, in a possible implementation, these features may form a feature set that a BD neural network 225 can use to determine a beat. One advantage of the features in this feature set is that they do not require computationally intensive mathematical calculation, which conserves processing power. Additionally the calculations share common elements (e.g., mean, standard deviation, etc.) so that the calculations of the shared common elements only need to be performed once of the feature set, thereby further conserving processing power.

The BD neural network 225 can be implemented as a long short term memory (LSTM) neural network. In this implementation, the entire cross-correlation vector (i.e., $\bar{E}_{b\_xcor}$[m]) may be used by the neural network to make reach a BD decision. In another possible implementation, the BD neural network 225 can be implemented as a feed-forward neural network that uses a single max value of the cross correlation vector, namely, $E_{max\_xcor}$[m] to reach a BD decision. The particular type BD neural network implemented can be based on a balance between performance and power efficiency. For beat detection, the feed forward neural network may show better performance and improved power efficiency.

Figure 5:
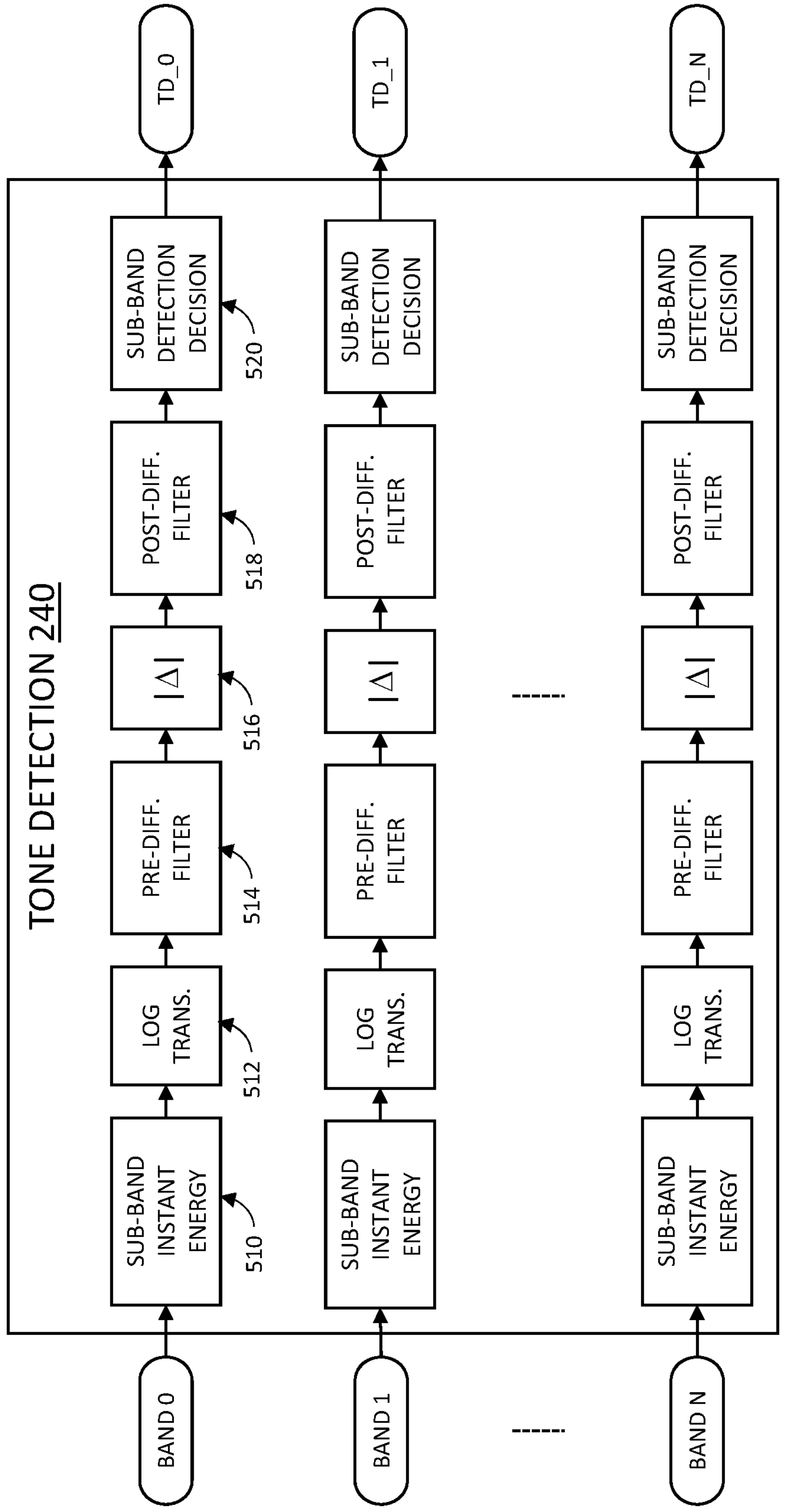
FIG. 5 is a block diagram that generally depicts a tone detection unit of the feature detection and tracking unit of the music classifier according to a possible implementation.

FIG. 5 is a block diagram that generally depicts a tone detection unit 240 of the feature detection and tracking unit 200 of the music classifier 140 according to a possible implementation. The inputs to the tone detection unit 240 are the sub-band complex data from the signal condition stage. While all N bands can be utilized to detect tonality, experiments have indicated that sub-bands above 4 kHz may not contain enough information to justify the extra computations unless power efficiency is not of any concern. Thus, for a $0<k<N_{TN}$, where $N_{TN}$ is the total number of sub-bands to search for the presence of tonality over, the instantaneous energy 510 of the sub-band complex data is calculated for each band as such:

$$E_{inst}[n,k]=|X[n,k]|^2$$

Next, the band energy data is converted 512 to log2. While a high precision log2 operation can be used, if the operation is considered too expensive, one that would approximate the results within fractions of dB may be sufficient as long as the approximation is relatively linear in its error and monotonically increasing. One possible simplification is the straight-line approximation given as:

$$L=E+2\,m_r$$

where E is the exponent of the input value and $m_r$ is the remainder. The approximation L can then be determined using a leading bit detector, 2 shift operations, and an add operation, instructions that are commonly found on most microprocessors. The log2 estimate of the instantaneous energy, called $E_{inst\_log}$[n, k], is then processed through a low-pass filter 514 to remove any adjacent bands' interferences and focus on the center band frequency in band k:

$$E_{pre\_diff}[n,k]=\alpha_{pre}\times E_{pre\_diff}[n-1,k]+(1-\alpha_{pre})\times E_{inst\_log}[n,k]$$

where $\alpha_{pre}$ is the effective cut-off frequency coefficient and the resulting output is denoted by $E_{pre\_diff}$[n, k] or the pre-differentiation filter energy. Next a first order differentiation 516 takes place in the form of a single difference over the current and previous frames of R sample:

$$\Delta_{mag}[n,k]=E_{pre\_diff}[n,k]-E_{pre\_diff}[n-1,k]$$

and the absolute value of $\Delta_{mag}$ is taken. The resulting output $|\Delta_{mag}[n,k]|$ is then passed through a smoothing filter 518 to obtain an averaged $|\Delta_{mag}[n,k]|$ over multiple time frames:

$$\Delta_{mag\_avg}[n,k]=\alpha_{post}\times\Delta_{mag\_avg}[n-1,k]+(1-\alpha_{post})\times|\Delta_{mag}[n,k]|$$

where $\alpha_{post}$ is the exponential smoothing coefficient and the resulting output $\Delta_{mag\_avg}$[n, k] is a pseudo-variance measurement of the energy in band k and frame n in the log domain. Lastly, two conditions are checked to decide 520 (i.e., determine) whether tonality is present or not: $\Delta_{mag\_avg}$[n, k] is checked against a threshold below which the signal is considered to have a low enough variance to be tonal and, $E_{pre\_diff}$[n, k] is checked against a threshold to verify the observed tonal component contains enough energy in the sub-band:

$$TN[n,k]=(\Delta_{mag\_avg}[n,k]<\text{Tonality}_{Th}[k])\ \&\&\ (E_{pre\_diff}[n,k]>SB\text{Mag}_{Th}[k])$$

where TN[n, k] holds the tonality presence status in band k and frame n at any given time. In other words the outputs TD_0, TD_1, . . . TD_N can correspond to the likely hood that a tone within the band is present.

One common signal that is not music but contains some tonality, exhibits similar (to some types of music) temporal modulation characteristics, and possesses similar (to some types of music) spectrum shape to music is speech. Since it is difficult to robustly distinguish speech from music based on the modulation patterns and spectrum differences, the tonality level becomes the critical point of distinction. The threshold, $\text{Tonality}_{Th}$[k], must therefore be carefully selected not to trigger on speech but rather only in music. Since the value of $\text{Tonality}_{Th}$[k] depends on the pre and post differentiation filtering amount, namely the values selected for $\alpha_{pre}$ and $\alpha_{post}$, which themselves depend on $F_S$ and the chosen filter-bank characteristics, independent values cannot be suggested. However, the optimal threshold value can be obtained through optimizations on a large database for a selected set of parameter values. While $\text{SBMag}_{Th}$[k] also depends on the selected $\alpha_{pre}$ value, it is far less sensitive as its purpose is to merely make sure the discovered tonality is not too low in energy to be insignificant.

Figure 6:
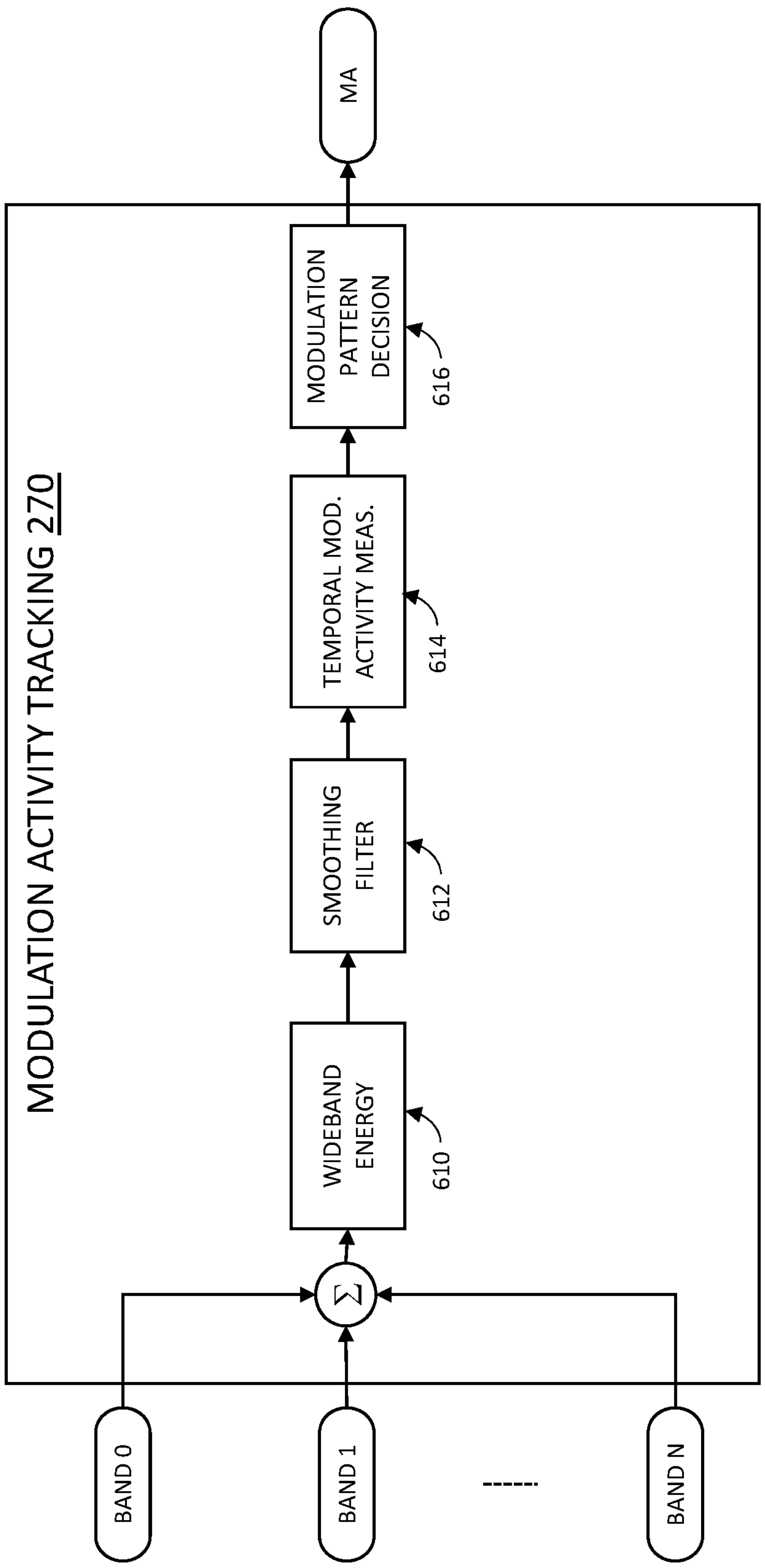
FIG. 6 is a block diagram that generally depicts a modulation and activity tracking unit of the feature detection and tracking unit of the music classifier according to a possible implementation.

FIG. 6 is a block diagram that generally depicts a modulation and activity tracking unit 270 of the feature detection and tracking unit 200 of the music classifier 140 according to a possible implementation. The input to the modulation activity tracking unit are the sub-band (i.e., band) complex data from the signal condition stage. All bands are combined (i.e., summed) to for a wideband representation of the audio signal. The instantaneous wideband energy 610 $E_{wb\_inst}$[n] is calculated as:

$$E_{wb\_inst}[n]=\sum_{k=0}^{N_{sb}-1}|X[n,k]|^2$$

where X[n, k] is the complex WOLA (i.e., sub-band) analysis data at frame n and band k. The wideband energy is then averaged over several frames by a smoothing filter 612:

$$E_{wb}[n]=\alpha_w\times E_{wb}[n-1]+(1-\alpha_w)\times E_{wb\_inst}[n]$$

where $\alpha_w$ is the smoothing exponential coefficient and $E_{wb}[n]$ is the averaged wideband energy. Beyond this step the modulation activity can be tracked to measure 614 a temporal modulation activity through different ways, some being more sophisticated while others being computationally more efficient. The simplest and perhaps the most computationally efficient method includes performing minimum and maximum tracking on the averaged wideband energy. For example the global minimum value of the averaged energy could be captured every 5 seconds as the min estimate of the energy, and the global maximum value of the averaged energy could be captured every 20 ms as the max estimate of the energy. Then, at the end of every 20 ms, the relative divergence between the min and max trackers is calculated and stored:

$$r[m_{mod}] = \frac{\text{Max}[m_{mod}]}{\text{Min}[m_{mod}]}$$

where $m_{mod}$ is the frame number at the 20 ms interval rate, $\text{Max}[m_{mod}]$ is the current estimate of the wideband energy's maximum value, $\text{Min}[m_{mod}]$ is the current (last updated) estimate of the wideband energy's minimum value, and, $r[m_{mod}]$ is the divergence ratio. Next the divergence ratio is compared against a threshold to determine a modulation pattern 616:

$$LM[m_{mod}]=(r[m_{mod}]<\text{Divergence}_{th})$$

The divergence value can take a wide range. A low-medium to high range would indicate an event that could be music, speech, or noise. Since the variance of a pure tone's wideband energy is distinctly low, an extremely low divergence value would indicate either a pure tone (of any loudness level) or an extremely low level non-pure-tone signal that would be in all likelihood too low to be considered anything desirable. The distinctions between speech vs. music and noise vs. music are made through tonality measurements (by the Tonality Detection Unit) and the beat presence status (by the Beat Detector Unit) and the modulation pattern or the divergence value does not add much value in that regard. However, since pure tones cannot be distinguished from music through tonality measurements and when present, they can satisfy the tonality condition for music, and since an absence of a beat detection does not necessarily mean a no-music condition, there is an explicit need for an independent pure-tone detector. As discussed, since the divergence value can be a good indicator for whether a pure tone is present or not, we use the modulation pattern tracking unit exclusively as a pure-tone detector to distinguish pure tones from music when tonality is determined to be present by the tone detection unit 240. Consequently, we set the $\text{Divergence}_{th}$ to a small enough value below which only either a pure tone or an extremely low level signal (that is of no interest) can exist. Consequently, LM $[m_{mod}]$ or the low modulation status flag effectively becomes a "pure-tone" or a "not-music" status flag to the rest of the system. The output (MA) of the modulation activity tracking unit 270 corresponds to a modulation activity level and can be used to inhibit a classification of a tone as music.

Figure 7A:
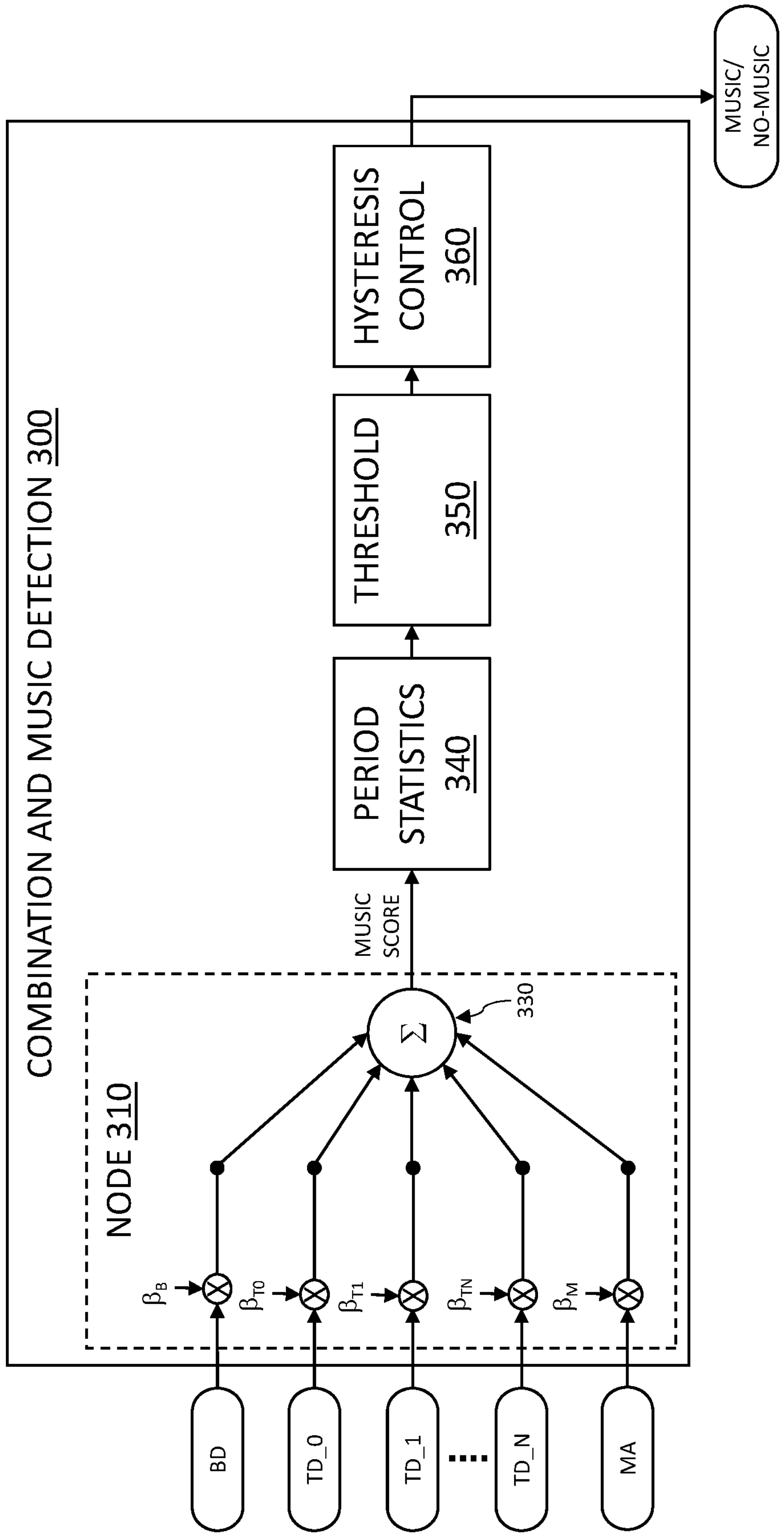
FIG. 7A is a block diagram that generally depicts a combination and music detection unit of the music classifier according to a first possible implementation.

FIG. 7A is a block diagram that generally depicts a combination and music detection unit 300 of the music classifier 140 according to a first possible implementation. In a node unit 310 of the combination and music detection unit 300 receives all the individual detection units' outputs (i.e., feature scores) (e.g., BD, TD_1, TD_2, TD_N, MA) and applies a weight ($\beta_B$, $\beta_{T0}$, $\beta_{T1}$, $\beta_{TN}$, $\beta_M$) to obtain a weighted feature score for each. The results are combined 330 to formulate a music score (e.g., for a frame of audio data). The music score can be accumulated over an observation period, during which a plurality of music scores for a plurality of frames is obtained. Period statistics 340 may then be applied to the music scores. For example, the music scores obtained may be averaged. The results of the period statistics is compared to a threshold 350 to determine if music is present during the period or if music is not present during the period. The combination and detection unit is also configured to apply hysteresis control 360 to the threshold output to prevent potential speech classifications fluttering in between the observation periods. In other words, a current threshold decision may be based on one or more pervious threshold decisions. After hysteresis control 360 is applied, a final speech classification decision (MUSIC/NO-MUSIC) is provided or made available to other subsystems in the audio device.

The combination and music detection unit 300 may operate on asynchronously arriving inputs from the detection units (e.g., beat detection 210, tone detection 240, and modulation activity tracking 270) as they operate on different internal decision making (i.e., determination) intervals. The combination and music detection unit 300 also operates in an extremely computationally efficient form while maintaining accuracy. At the high level, several criteria must be satisfied for music to be detected. For example, a strong beat or a strong tone is present in the signal and the tone is not a pure-tone or an extremely low level signal.

Since the decisions come in at different rates, the base update rate is set to the shortest interval in the system which is the rate the tonality detection unit 240 operates on or on every R samples (the n frames). The feature scores (i.e., decisions) are weighted and combined into a music score (i.e., score) as such:

At every frame n:

$$B[n]=BD\,[m_{bd}]$$

$$M[n]=LM[m_{mod}]$$

where B[n] is updated with the latest beat detection status and, M[n] is updated with the latest modulation pattern status. Then at every $N_{MD}$ interval:

$$\text{Score} = 0$$

$$\text{Score} = \sum_{i=0}^{N_{MD}-1}\left(\max\left(0, \beta_B B[n-i] + \sum_{k=0}^{N_{TN}-1} \beta_{Tk} TN[n-i,k] + \beta_M M[n-i]\right)\right)$$

$$\text{Music Detected} = (\text{Score} > MusicScore_{th})$$

where $N_{MD}$ is the music detection interval length in frames, $\beta_B$ is the weight factor associated with beat detection, $\beta_{Tk}$ is the weight factor associated with tonality detection, and, $\beta_M$ is the weight factor associated with pure-tone detection. The β weight factors can be determined based using training and or use and are typically factory set. The values of the β weight factors may depend on several factors that are described below.

First, the values of the β weight factors may depend on an event's significance. For example, a single tonality hit may not be as significant of an event compared to a single beat detection event.

Second, the values of the β weight factors may depend on the detection unit's internal tuning and overall confidence level. It is generally advantageous to allow some small percentage of failure at the lower level decision making stages and let long-term averaging to correct for some of that. This allows avoiding setting very restrictive thresholds at the low levels, which in turn, increases the overall sensitivity of the algorithm. The higher the specificity of the detection unit (i.e. a lower misclassification rate), the more significant the decision should be considered and therefore a higher weight value must be chosen. Conversely, the lower the specificity of the detection unit (i.e. a higher misclassification rate), the less conclusive the decision should be considered and therefore a lower weight value must be chosen.

Third, the values of the β weight factors may depend on the internal update rate of the detection unit compared to the base update rate. Even though B [n], TN[n, k] and M[n] are all combined at every frame n, B[n], M[n] hold the same status pattern for many consecutive frames due to the fact that the beat detector and the modulation activity tracking units update their flags at a decimated rate. For example, if $BD[m_{bd}]$ runs on an update interval period of 20 ms and the base frame period is 0.5 ms, for every one actual $BD[m_{bd}]$ beat detection event, B[n] will produce 40 consecutive frames of beat detection events. Thus, the weight factors must consider the multi-rate nature of the updates. In the example above, if the intended weight factor for a beat detection event has been decided to be 2, then $\beta_B$ should be assigned to $$\frac{2}{\frac{20}{0.5}} = 0.05$$

to take into account the repeating pattern.

Fourth, the values of the β weight factors may depend on the correlation relationship of the detection unit's decision to music. A positive β weight factor is used for detection units that support presence of music and a negative β weight factor is used for the ones that reject presence of music. Therefore the weight factors $\beta_B$ and $\beta_{Tk}$ hold positive weights whereas $\beta_m$ holds a negated weight value.

Fifth, the values of the β weight factors may depend on the architecture of the algorithm. Since M[n] must be incorporated into the summation node as an AND operation rather than an OR operation, a significantly higher weight may be chosen for $\beta_m$ to nullify the outputs of B[n] and TN[n, k] and act as an AND operation.

Even in the presence of music, not every music detection period may necessarily detect music. Thus is may be desired to accumulate several periods of music detection decisions prior to declaring music classification to avoid potential music detection state fluttering. It may also be desired to remain in the music state longer if we have been in the music state for a long time. Both objectives can be achieved very efficiently with the help of a music status tracking counter:

```
if MusicDetected
    MusicDetectedCounter=MusicDetectedCounter+1;
else
    MusicDetectedCounter=MusicDetectedCounter−1;
end
    MusicDetectedCounter=max(0, MusicDetectedCounter)
    MusicDetectedCounter=min(MAX_MUSIC_DETECTED_COUNT, MusicDetectedCounter)
```

where MAX_MUSIC_DETECTED_COUNT is the value at which the MusicDetectedCounter is capped at. A threshold is then assigned to the MusicDetectedCounter beyond which music classification is declared:

$$\text{MusicClassification}=(\text{MusicDetectedCounter}\geq\text{MusicDetectedCoutner}_{th})$$

Figure 7B:
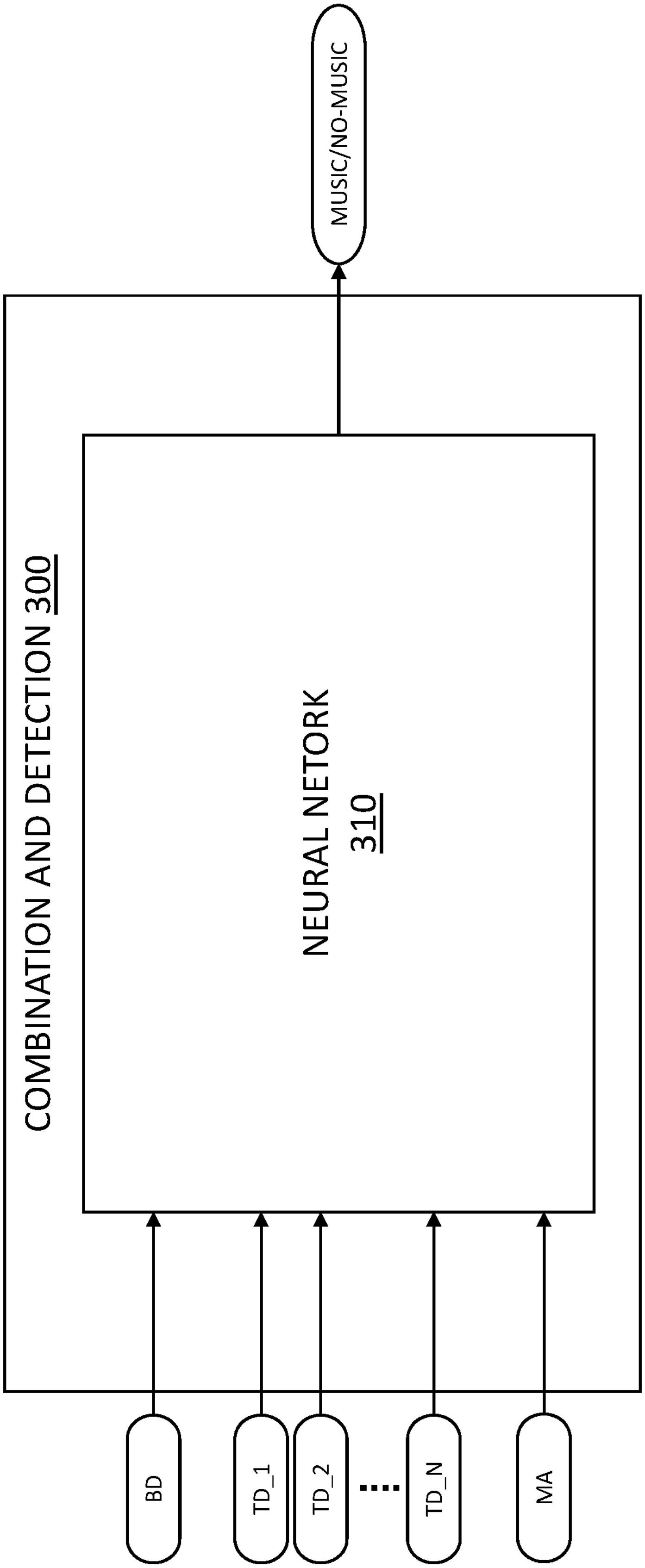
FIG. 7B is a block diagram that generally depicts a combination and music detection unit of the music classifier according to a second possible implementation.

In a second possible implementation of the combination and detection unit 300 of the music classifier 140, the weight application and combination process can be replaced by a neural network. FIG. 7B is a block diagram that generally depicts a combination and music detection unit of the music classifier according to the second possible implementation. The second implementation may consume more power than the first implementation (FIG. 7A). Accordingly the first possible implementation could be used for lower available power applications (or modalities), while the second possible implementation could be used for higher available power applications (or modalities).

The output of the music classifier 140 may be used in different ways and the usage depends entirely on the application. A fairly common outcome of a music classification state is retuning of parameters in the system to better suit a music environment. For example, in a hearing aid, when music is detected, an existing noise reduction may be disabled or tuned down to avoid any potential unwanted artifacts to music. In another example, a feedback canceller, while music is detected, does not react to the observed tonality in the input in the same way that it would when music is not detected (i.e., the observed tonality is due to feedback). In some implementations, the output of the music classifier 140 (i.e., MUSIC/NO-MUSIC) can be shared with other classifiers and/or stages in the audio device to help the other classifiers and/or stages perform one or more functions.

Figure 8:
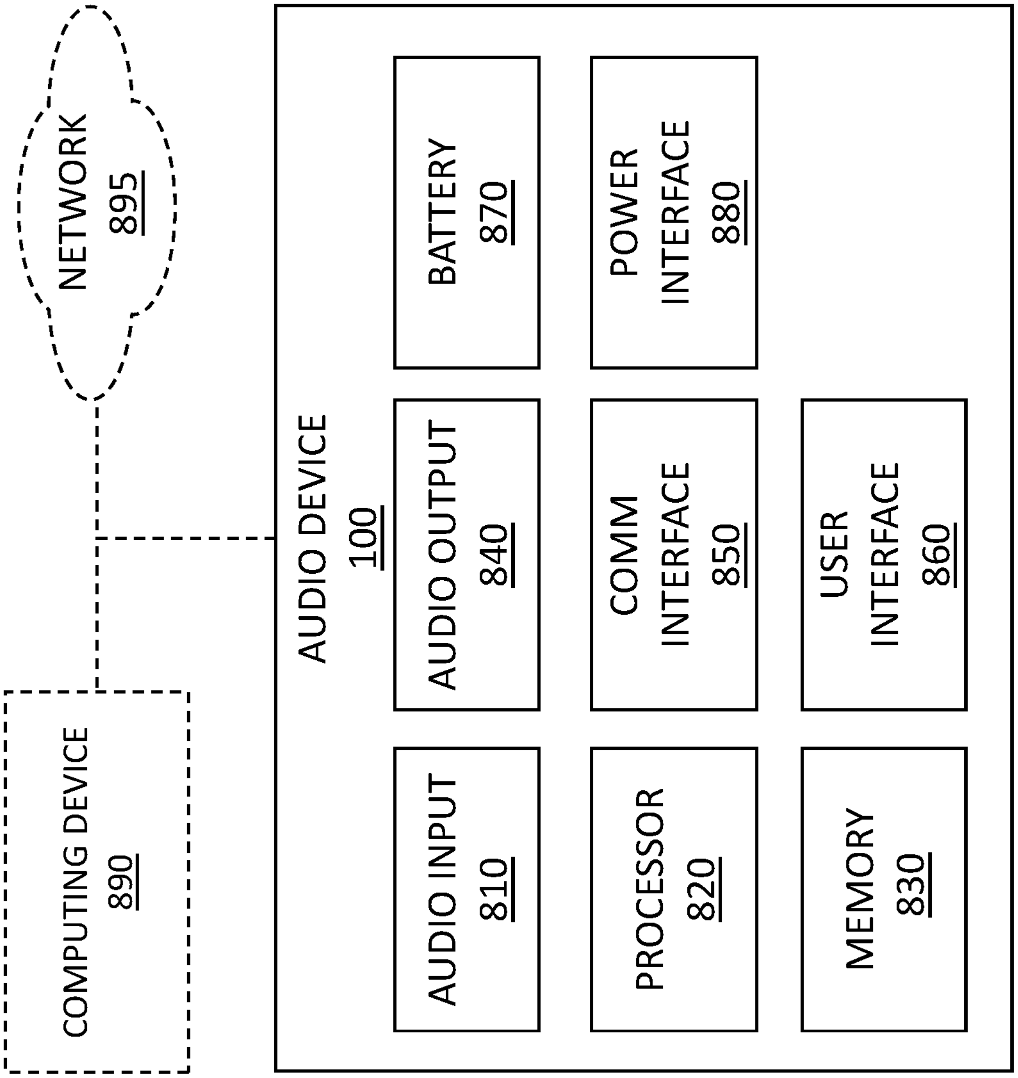
FIG. 8 is a hardware block diagram that generally depicts an audio device according to a possible implementation of the present disclosure.

FIG. 8 is a hardware block diagram that generally depicts an audio device 100 according to a possible implementation of the present disclosure. The audio device includes a processor (or processors) 820, which can be configured by software instructions to carry out all or a portion the functions described herein. Accordingly, the audio device 100 also includes a memory 830 (e.g., a non-transitory computer readable memory) for storing the software instructions as well as the parameters for the music classifier (e.g., weights). The audio device 100 may further include an audio input 810, which can include the microphone and the digitizer (A/D) 120. The audio device may further include an audio output 840, which can include the digital to analog (D/A) converter 160 and a speaker 170 (e.g., ceramic speaker, bone conduction speaker, etc.). The audio device may further include a user interface 860. The user interface may include hardware, circuitry, and/or software for receiving voice commands. Alternatively or additionally, the user interface may include controls (e.g., buttons, dials, switches) that a user may adjust to adjust parameters of the audio device. The audio device may further include a power interface 880 and a battery 870. The power interface 880 may receive and process (e.g., regulate) power for charging the battery 870 or for operation of the audio device. The battery may be a rechargeable battery that receives power from the power interface and that can be configured to provide energy for operation of the audio device. In some implementations the audio device may be communicatively coupled to one or more computing devices 890 (e.g., a smart phone) or a network (e.g., cellular network, computer network). For these implementations, the audio device may include a communication (i.e., COMM) interface 850 to provide analog or digital communications (e.g., WiFi, BLUETOOTH™). The audio device may be a mobile device and may be physically small and shaped so as to fit into the ear canal. For example, the audio device may be implemented as a hearing aid for a user.

Figure 9:
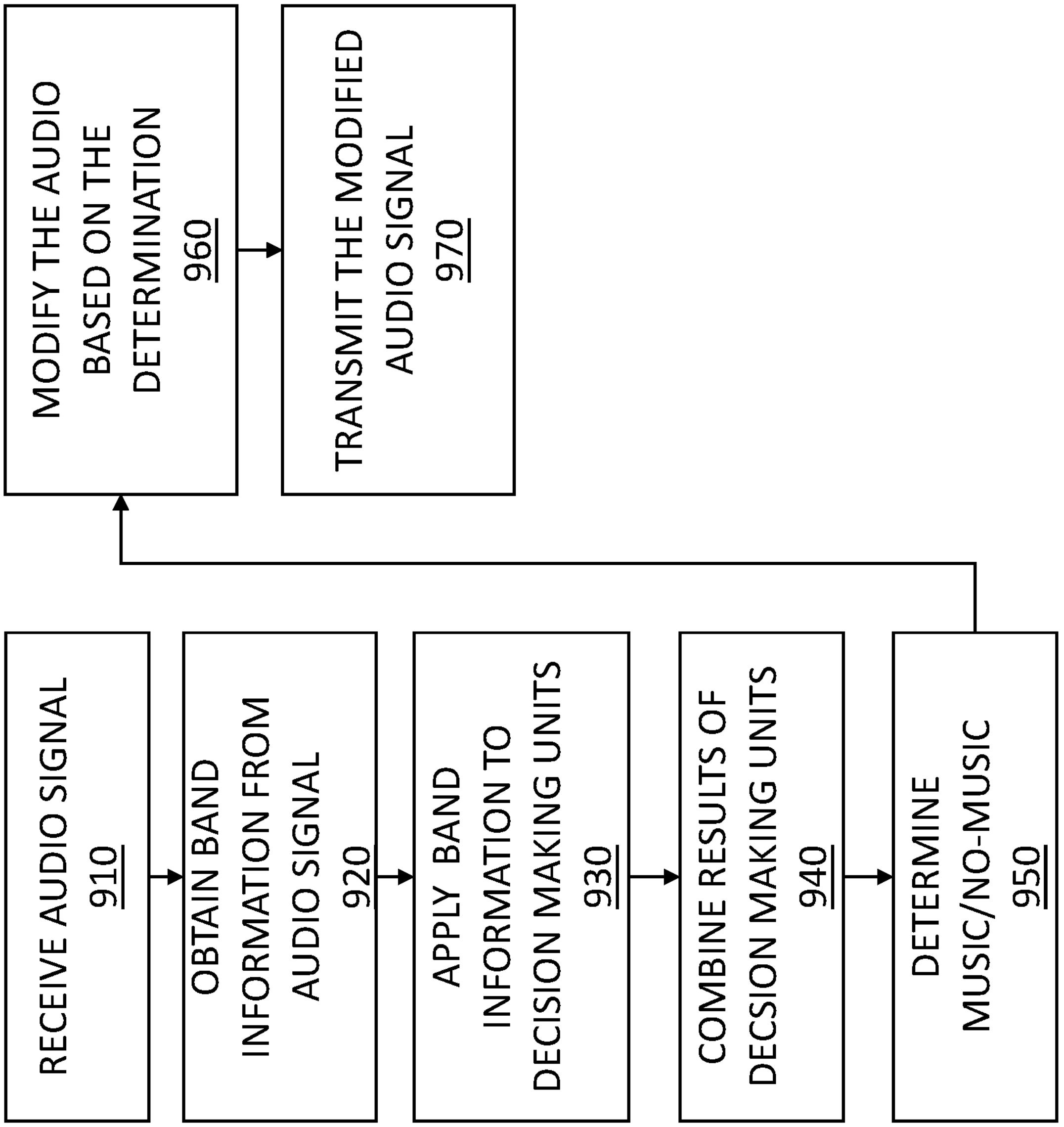
FIG. 9 is a method for detecting music in an audio device according to a possible implementation of the present disclosure.

FIG. 9 is a flowchart of a method for detecting music in an audio device according to a possible implementation of the present disclosure. The method may be carried out by hardware and software of the audio device 100. For example a (non-transitory) computer readable medium (i.e. memory) containing computer readable instructions (i.e. software) can be accessed by the processor 820 to configure the processor to perform all or a portion of the method shown in FIG. 9.

The method begins by receiving 910 an audio signal (e.g., by a microphone). The receiving may include digitizing the audio signal to create a digital audio stream. The receiving may also include dividing the digital audio stream may be divided into frames and buffering the frames for processing.

The method further includes obtaining 920 sub-band (i.e. band) information corresponding to the audio signal. Obtaining the band information may include (in some implementations) applying a weighted overlap-add (WOLA) filter-bank to the audio signal.

The method further includes applying 930 the band information to one or more decision making units. The decision making units may include a beat detection (BD) unit that is configured to determine the presence or absence of a beat in the audio signal. The decision making units may also include a tone detection (TD) unit (i.e. tonality detection unit) that is configured to determine the presence or absence of one or more tones in the audio signal. The decision making units may also include a modulation activity (MA) tracking unit that is configured to determine the level (i.e., degree) of modulation in the audio signal.

The method further includes combining 940 the results (i.e., the status, the state) of each of the one or more decision units. The combining may include applying a weight to each output of the one or more decision making units and then summing the weighted values to obtain a music score. The combination can be understood as similar to a combination associated with computing a node in a neural network. Accordingly, in some (more complex) implementations the combining 940 may include applying the output of the one or more decision making units to a neural network (e.g., deep neural network, feed forward neural network).

The method further includes determining 950 music (or no-music) in the audio signal from the combined results of the decision making units. The determining may include accumulating music scores from frames (e.g., for a time period, for a number of frames) and then averaging the music scores. The determining may also include comparing the accumulated and averaged music score to a threshold. For example, when the accumulated and average music score is above the threshold then music is considered present in the audio signal, and when the accumulated and averaged music score is below the threshold then music is considered absent from the audio signal. The determining may also include applying hysteresis control to the threshold comparison so that a previous state of music/no-music influences the determination of the present state to prevent music/no-music states from fluttering back and forth.

The method further includes modifying 960 the audio based on the determination of music or no-music. The modifying may include adjusting a noise reduction so that music levels are not reduces as if there were noise. The modifying may also include disabling a feedback canceller so that tones in the music are not cancelled as if they were feedback. The modifying may also include increasing a pass band for the audio signal so that the music is not filtered.

The method further includes transmitting 970 the modified audio signal. The transmitting may include converting a digital audio signal to an analog audio signal using a D/A converter. The transmitting may also include coupling the audio signal to a speaker.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The disclosure describes a plurality of possible detection features and combination methods for a robust and power efficient music classification. For example, the disclosure describes, a neural network based beat detector that can use a plurality of possible features extracted from a selection of (decimated) frequency band information. When specific math is disclosed (e.g., a variance calculation for a tonality measurement) it may be described as inexpensive (i.e., efficient) from a processing power (e.g., cycles, energy) standpoint. While these aspects and others have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

The invention claimed is:

1. A music classifier for an audio device, the music classifier comprising:

a signal conditioning unit configured to transform a digitized, time-domain audio signal into a corresponding frequency domain signal including a plurality of frequency bands;

a plurality of decision making units operating in parallel that are each configured to evaluate one or more of the plurality of frequency bands to determine a plurality of feature scores, each feature score corresponding to a characteristic associated with music, the plurality of decision making units including:

a modulation activity tracking unit configured to output a feature score for modulation activity based on a ratio of a first value of an averaged wideband energy of the plurality of frequency bands to a second value of the averaged wideband energy of the plurality of frequency bands; and a tone detection unit configured to output feature scores for tone in each frequency band based on (i) an amount of energy in the frequency band and (ii) a variance of the energy in the frequency band based on a first order differentiation; and a combination and music detection unit configured to:

asynchronously receive feature scores from the plurality of decision making units, the decision making units configured to output feature scores at different intervals; and combine the plurality of feature scores over a period of time to determine if the audio signal includes music.

2. The music classifier for the audio device according to claim 1, wherein the plurality of decision making units include a beat detection unit.

3. The music classifier for the audio device according to claim 2, wherein the beat detection unit is configured to detect, based on a correlation, a repeating beat pattern in a first frequency band that is the lowest of the plurality of frequency bands.

4. The music classifier for the audio device according to claim 2, wherein the beat detection unit is configured to detect a repeating beat pattern, based on an output of a beat detection (BD) neural network.

5. The music classifier for the audio device according to claim 4, wherein the beat detection unit is configured to select one or more frequency bands from the plurality of frequency bands and is configured to extract a plurality of features from each selected frequency band.

6. The music classifier for the audio device according to claim 5, wherein the plurality of features extracted from each selected frequency band form a feature set including an energy mean, an energy standard deviation, an energy maximum, an energy kurtosis, an energy skewness, and an energy cross-correlation vector.

7. The music classifier for the audio device according to claim 6, wherein the BD neural network receives the feature set for each selected band as a plurality of inputs.

8. The music classifier for the audio device according to claim 1, wherein the second value corresponds a minimum of the averaged wideband energy and the first value corresponds to a maximum of the averaged wideband energy, the averaged wideband energy corresponding to an average of a sum of the energy in each of the plurality of frequency bands.

9. The music classifier for the audio device according to claim 1, wherein the combination and music detection unit is configured to apply a weight to each feature score to obtain weighted feature scores and to sum the weighted feature scores to obtain a music score, each weight having a value that depends, in part, on the interval that the corresponding feature score is output from the decision making unit.

10. The music classifier for the audio device according to claim 9, wherein the combination and music detection unit is further configured to accumulate music scores for a plurality of frames, to compute an average of the music scores for the plurality of frames, and to compare the average to a threshold.

11. The music classifier for the audio device according to claim 10, wherein the combination and music detection unit is further configured to apply a hysteresis control to a music or no music output of the threshold.

12. A method for music detection in an audio signal, the method comprising:

receiving an audio signal;

digitizing the audio signal to obtain a digitized audio signal;

transforming the digitized audio signal into a plurality of frequency bands;

applying the plurality of frequency bands to a plurality of decision making units operating in parallel, the plurality of decision making units including:

a modulation activity tracking unit configured to output a feature score for modulation activity based on a ratio of a first value of an averaged wideband energy of the plurality of frequency bands to a second value of the averaged wideband energy of the plurality of frequency bands; and a tone detection unit configured to output feature scores for tone in each frequency band based on (i) an amount of energy in the frequency band and (ii) a variance of the energy in the frequency band based on a first order differentiation; and obtaining, asynchronously, a feature score from each of the plurality of decision making units, the decision making units configured to output feature scores at different intervals, and the feature score from each decision making unit corresponding to a probability that a particular music characteristic is included in the audio signal; and combining the feature scores to detect music in the audio signal.

13. The method for music detection according to claim 12, wherein the decision making units include a beat detection unit, and wherein:

obtaining a feature score from the beat detection unit includes:

detecting, based on a correlation, a repeating beat pattern in a first frequency band that is the lowest of the plurality of frequency bands.

14. The method for music detection according to claim 12, wherein the decision making units include a beat detection unit, and wherein:

obtaining a feature score from the beat detection unit includes:

detecting, based on a neural network, a repeating beat pattern in the plurality of frequency bands.

15. The method for music detection according to claim 12, wherein:

obtaining a feature score from the modulation activity tracking unit includes:

tracking a minimum averaged energy of a sum of the plurality of frequency bands as the second value and a maximum averaged energy of the sum of the plurality of frequency bands as the first value.

16. The method for music detection according to claim 12, wherein the combining comprises;

multiplying the feature score from each of the plurality of decision making units with a respective weight to obtain a weighted score from each of the plurality of decision making units, each weight having a value that depends, in part, on the interval that the corresponding feature score is output from the decision making unit;

summing the weighted scores from the plurality of decision making units to obtain a music score;

accumulating music scores over a plurality of frames of the audio signal;

averaging the music scores from the plurality of frames of the audio signal to obtain an average music score; and comparing the average music score to a threshold to detecting music in the audio signal.

17. The method for music detection in an audio signal according to claim 12, further comprising:

modifying the audio signal based on the music detection; and transmitting the audio signal.

18. A hearing aid, comprising:

a signal conditioning stage configured to convert a digitized audio signal to a plurality of frequency bands; and a music classifier coupled to the signal conditioning stage, the music classifier including:

a feature detection and tracking unit that includes a plurality of decision making units operating in parallel, each decision making unit configured to generate a feature score corresponding to a probability that a particular music characteristic is included in the audio signal, the plurality of decision making units including:

a modulation activity tracking unit, the modulation activity tracking unit configured to output a feature score for modulation activity based on a ratio of a first value of an averaged wideband energy of the plurality of frequency bands to a second value of the averaged wideband energy of the plurality of frequency bands; and a tone detection unit configured to output feature scores for tone in each frequency band based on (i) an amount of energy in the frequency band and (ii) a variance of the energy in the frequency band based on a first order differentiation; and a combination and music detection unit configured to:

asynchronously receive feature scores from the plurality of decision making units, the decision making units configured to output feature scores at different intervals; and combine the plurality of feature scores over time to detect music in the audio signal, the combination and music detection unit configured to produce a first signal indicating music while music is detected in the audio signal and configured to produce a second signal indicating no-music signal otherwise.

19. The hearing aid according to claim 18, wherein the hearing aid includes an audio signal modifying stage coupled to the signal conditioning stage and to the music classifier, the audio signal modifying stage configured to process the plurality of frequency bands differently when a music signal is received than when a no-music signal is received.

* * * * *